(12) United States Patent
Cho et al.

(10) Patent No.: US 6,274,273 B1
(45) Date of Patent: Aug. 14, 2001

(54) POSITIVE ACTIVE MATERIAL FOR RECHARGEABLE LITHIUM BATTERY AND METHOD OF PREPARING SAME

(75) Inventors: Jae-Phil Cho; Geun-Bae Kim, both of Suwon-si; Yong-Chul Park, Chungcheongnam-do, all of (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/669,775

(22) Filed: Sep. 22, 2000

(30) Foreign Application Priority Data

Nov. 17, 1999 (KR) .................................................. 99-51149

(51) Int. Cl.$^7$ .................................................. H01M 10/24
(52) U.S. Cl. ................. 429/231.95; 429/231.3; 429/218.1; 252/182.1
(58) Field of Search ...................... 252/182.1; 429/231.3, 429/231.95, 224, 218.1

(56) References Cited

U.S. PATENT DOCUMENTS 5,783,332 * 7/1998 Amine et al. ..................... 429/218.1
6,103,422 * 8/2000 Kanai ................................... 429/224

* cited by examiner

*Primary Examiner*—Gabrielle Brouillette
*Assistant Examiner*—M. Wills
(74) *Attorney, Agent, or Firm*—Christie, Parker & Hale, LLP

(57) ABSTRACT

Disclosed is a positive active material for a rechargeable lithium battery having a higher concentration of Co in the surface portion than in the central portion. The surface portion is a region from the outermost surface to a depth of 10 microns. The positive active material is represented $Li_{1+x}Mn_{2-y}Co_yO_4$ wherein $-0.1<x0.1$ and $0<y<0.1$. The positive active material is produced by obtaining a sol or gel cobalt material by mixing lithium salts, cobalt salts, an alcohol and chelating agents and heating the mixture, mixing the sol or gel cobalt material with $LiMn_2O_4$, and heat-treating the resulting mixture.

14 Claims, 7 Drawing Sheets

(4 of 7 Drawing Sheet(s) Filed in Color)

20μm

2μm

20μm

2μm

20μm

2μm

1 …

POSITIVE ACTIVE MATERIAL FOR RECHARGEABLE LITHIUM BATTERY AND METHOD OF PREPARING SAME

CROSS REFERENCE TO RELATED APPLICATION

This application claims priority to Korean patent application No. 1999-51149 filed on Nov. 17, 1999, the content of which is incorporated herein by reference.

FIELD OF THE INVENTION

The present invention relates to a positive active material for a rechargeable lithium battery and a method of preparing the same, and more particularly, to a positive active material for a rechargeable lithium battery exhibiting good cycle life characteristics at high temperatures.

BACKGROUND OF THE INVENTION

In recent years, the development of miniaturized portable electronics has provided a need for a rechargeable lithium battery having a high capacity as well as a light weight. The capacity of the rechargeable lithium battery depends on the positive active materials. The electrochemical characteristics of the positive active materials influence the high-rate cycle characteristics and the capacity retention of the rechargeable lithium battery.

Manganese-based active materials such as $LiMn_2O_4$, and $LiMnO_2$, among all of the positive active materials, are the easiest to prepare, are less expensive than the other materials and have environmentally friendly characteristics. Among such manganese-based compounds, $LiMn_2O_4$ is particularly stable for battery use and is thus attractive for electric vehicle applications.

$LiMn_2O_4$ exhibits good room-temperature cycle life characteristics, but poor high-temperature cycle life characteristics. The manganese in $LiMn_2O_4$ has an atomic value of 3.5, and thus it substantially has a formal charge of +3 and a formal charge of +4. Therefore, two types of Mn in $LiMn_2O_4$ exist: $Mn^{3+}$ and $Mn^{4+}$. When the ambient temperature is raised, stable $Mn^{4+}$ is not oxidized or reduced, but unstable $Mn^{3+}$ is oxidized to $Mn^{4+}$ or reduced to $Mn^{2+}$. This is a disproportionate reaction and causes an abrupt loss of capacity at high temperatures. This capacity loss mostly occurs in initial charge-discharge cycles, for example, between the first and tenth charge-discharge cycles.

In addition, when a battery using a manganese-based material such as $LiMn_2O_4$ is charged and discharged many times, particularly at high temperatures, a side reaction between the electrolyte and the manganese-based material occurs at the surface of the manganese-based material. It is believed that $H_2O$ reacts with $LiPF_6$ in the electrolyte to generate the strong acid HF, which attacks Mn presented at the surface of the manganese-based active material, and the attacked Mn is eluted into and dissolved in the electrolyte, so the active material disintegrates. This side reaction seriously deteriorates the cycle life characteristics of the battery.

Attempts to solve these problems have been performed by synthesizing a material including at least one equivalent of Li, or partially substituting oxygen (O) with fluoride (F) in a spinel manganese-based material. However, those methods do not effectively improve the cycle life characteristics of the battery, particularly at high temperatures.

SUMMARY OF THE INVENTION

It is an object of the present invention to provide a positive active material for a rechargeable lithium battery exhibiting good high-temperature cycle life characteristics.

It is another object to provide a method of preparing the positive active material for a rechargeable lithium battery.

These and other objects may be achieved by the positive active material for a rechargeable lithium battery $Li_{1+x}Mn_{2-y}Co_yO_4$ wherein $-01<x<0.1$ and $0<y<0.1$. The positive active material has a concentration of Co at a surface portion higher than that in a central portion. The surface portion is defined as a region from the outermost surface to a depth of 10 microns.

In order to achieve these objects and others, the present invention further provides a method of preparing the positive active material for a rechargeable lithium battery. In this method, lithium salts, cobalt salts, alcohols and chelating agents are mixed, and the mixture is heated to obtain a sol or gel type cobalt material. The sol or gel type cobalt material is then mixed with $LiMn_2O_4$ and the resulting mixture is heat-treated.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

A more complete appreciation of the invention, and many of the attendant advantages thereof, will be readily apparent as the same becomes better understood by reference to the following detailed description when considered in conjunction with the accompanying figures, wherein.

DETAILED DESCRIPTION OF THE INVENTION

Figure 1:
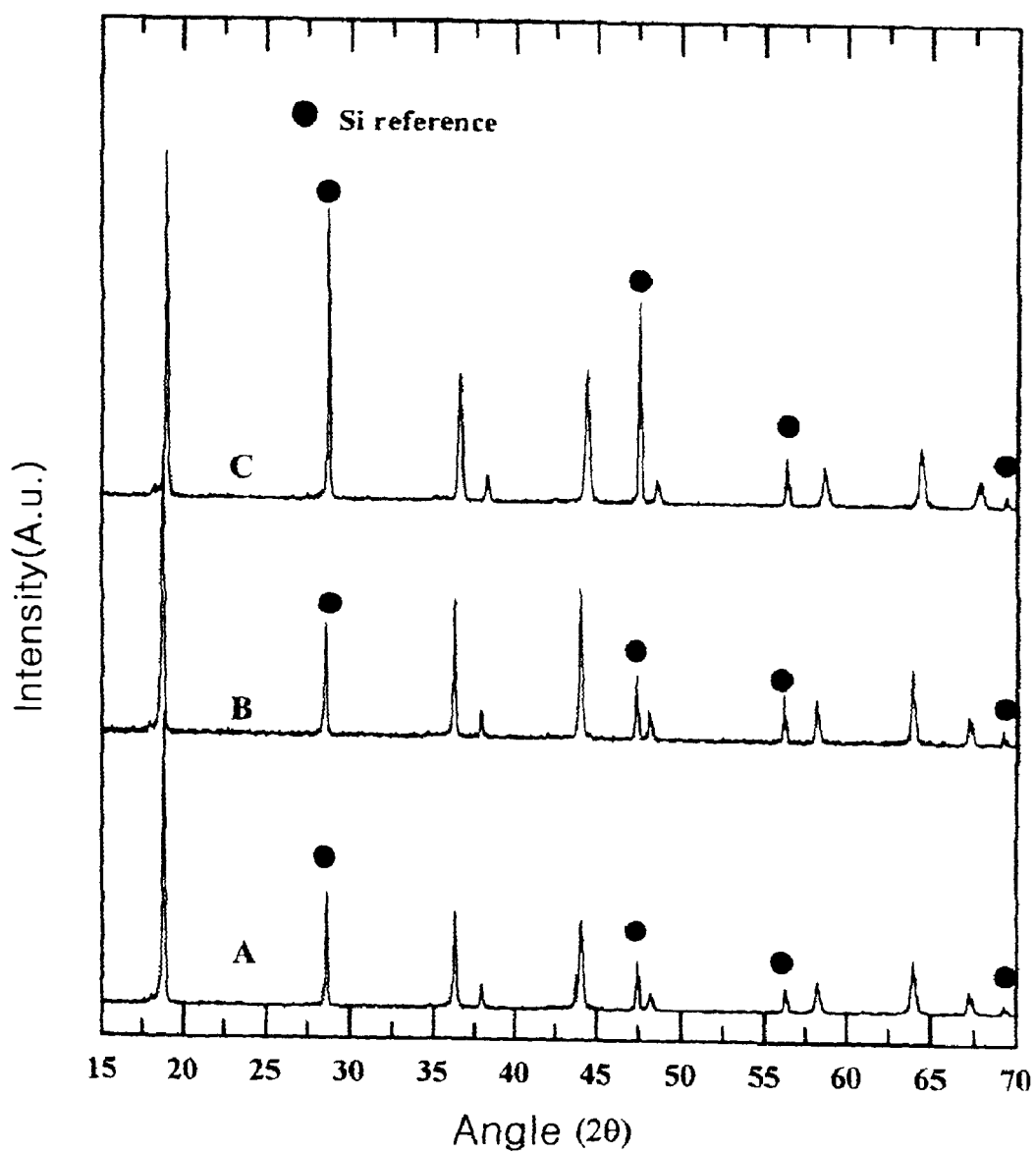
FIG. 1 is a graph illustrating X-ray diffraction (XRD) results of a material heat-treated at a low temperature according to Example 1, a positive active material heat-treated at low and high temperatures according to Example 1, and a positive active material according to comparative Example 1.

The positive active material of the present invention is $Li_{1+x}Mn_{2-y}Co_yO_4$–$01.1<x<01$ and $0<y>0.1$ and has a concentration gradient of Co. That is, the positive active material of the present invention has a higher concentration of Co in a surface portion than in a central portion. The surface portion is preferably a region from an outermost surface to a depth of 10 microns.

The positive active material preparation will be now described in more detail. Cobalt salts and lithium salts are weighed in the desired ratio, the salts and a chelating agent are mixed with an alcohol, and the mixture is heated to prepare a sol or a gel type cobalt material. The cobalt salt may be cobalt hydroxide, cobalt nitrate or cobalt carbonate, and the lithium salt may be lithium carbonate, lithium nitrate or lithium hydroxide. The chelating agent may be oxalic acid, citric acid or glycine, and the alcohol may be ethanol or methanol. The cobalt salts, lithium salts and alcohols are not limited to the above compounds.

The sol or gel type cobalt material is mixed with $LiMn_2O_4$. The mixing ratio of the cobalt material and $LiMn_2O_4$ is from 1:99 to 5:95 wt %. If the amount of the cobalt material is more than 5 wt %, the amount of Co doped into $LiMn_2O_4$ is too large and it may act as an impurity. But, if the amount of the cobalt material is less than 1 wt %, the desired effect of doping Co in the $LiMn_2O_4$ is not induced.

It is preferable to use $LiMn_2O_4$ having a spinel phase. $LiMn_2O_4$ may be produced by mixing manganese salts with lithium salts in the desired ratio and sintering the mixture at a temperature ranging from about 750 to 800° C. Alternatively, $LiMn_2O_4$ may be commercially purchased. The manganese salts may be manganese acetate or manganese dioxide, and the lithium salts may be lithium carbonate, lithium nitrate or lithium hydroxide. The manganese salts and lithium salts are not limited to the above compounds.

The mixture of the cobalt material and manganese compound is heat-treated at a temperature ranging from 550 to 850° C. The heat-treatment temperature preferably ranges from 700 to 850° C. because the crystallinity of $LiCoO_2$ is increased. Prior to the heat-treatment step, a pre-heat-treatment step may be performed at a temperature ranging from 100 to 300° C. In the heat-treatment step, $LiCoO_2$ reacts with $LiMn_2O_4$ to generate $Li_{1+x}Mn_{2-y}Co_yO_4$ wherein $0.1<x<0.1$ and $0<y<0.1$. The reaction occurs more actively in the surface portion than in the central portion, and thus the Co content in the surface portion of $LiMn_2O_4$ is higher than in the central portion thereof. The surface portion, as indicated, refers to a region from an outermost surface to a depth of 10 microns. The ratio of the concentration of Co in the central portion to that in the surface portion ranges from 1:1.05 to 1:1.3.

Electrolytes of rechargeable lithium batteries are generally non-aqueous, but a trace of water may be present in the electrolytes. Water reacts with lithium salts such as $LiPF_6$ in the electrolyte to generate strong acids such as HF. The generated HF attacks Mn present at the surface of the manganese-based positive active material, and Mn is eluted into the electrolyte such that the active material disintegrates. As a result, the cycle life characteristics, particularly the high-temperature cycle life characteristics, are extremely deteriorated. In the present invention, Co, which is abundant in the surface of $LiMn_2O_4$, protects Mn against attack by HF.

The positive active material is used in rechargeable lithium batteries. In rechargeable lithium batteries, a negative electrode is produced with a carbonaceous active material such as graphite or carbon, from or into which lithium ions are deintercalated or intercalated. A non-aqueous liquid electrolyte or a polymer electrolyte may be used. For separators, polymer films known in the related arts may be used.

The following examples further illustrate the present invention.

EXAMPLE 1

Lithium acetate and cobalt acetate in the molar ratio of 1:2 were added to 50 ml of methanol, and the mixture was uniformly shaken using a magnetic bar. 2 g of citric acid were then added to the mixture, and the resulting mixture was heated at 50° C. until a sticky gel was obtained. $LiMn_2O_4$ powder was added to the gel and uniformly mixed. Thereafter, the mixture obtained was pre-heat-treated at 150° C. for 3 hours, and the pre-heat-treated material was again heat-treated at 800° C. for 12 hours to produce a positive active material for a rechargeable lithium battery.

Comparative Example 1

$Li_2CO_3$ was uniformly mixed with $MnO_2$ and the mixture was sintered at 790° C. for 24 hours. The sintered material was cooled to room temperature to produce $LiMn_2O_4$.

Comparative Example 2

$Li_2CO_3$, $MnO_2$ and $Co(OH)_2$ were mixed, and the mixture was sintered at 790° C. for 24 hours to produce $Li_{1.03}Mn_{1.97}CO_{0.03}O_4$.

The XRD of the material pre-heat-treated at 150° C. and the positive active material heat-treated at 800° C. according to Example 1 were measured, and the results are shown in FIG. 1. The XRD result of the positive active material according to Comparative Example 1 is also shown in FIG. 1. As shown in FIG. 1, the material pre-heat-treated at 150° C. (B in FIG. 1) and the positive active material heat-treated at 800° C. for 12 hours (C in FIG. 1) exhibit no $LiCoO_2$ phase, like the positive active material according to Comparative Example 1 (A in FIG. 1). The results indicate that a very thin layer of $LiCoO_2$ is coated on $LiMn_2O_4$.

Figure 2A:
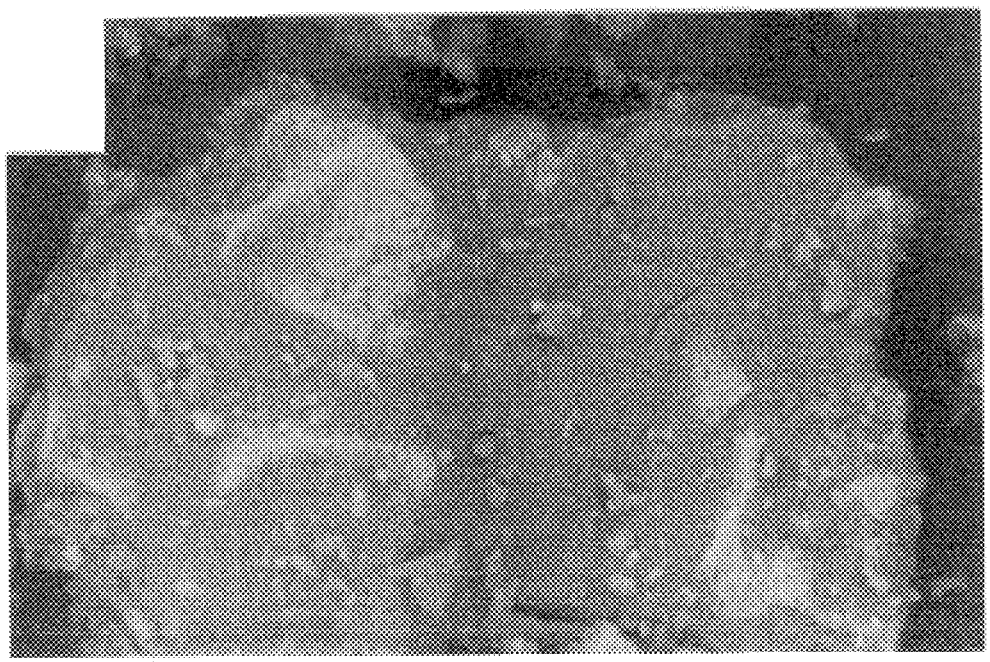
FIGS. 2a and 2b are scanning electron microscopy (SEM) photographs illustrating a material heat-treated at a low temperature in Example 1 of the present invention.
Figure 2B:
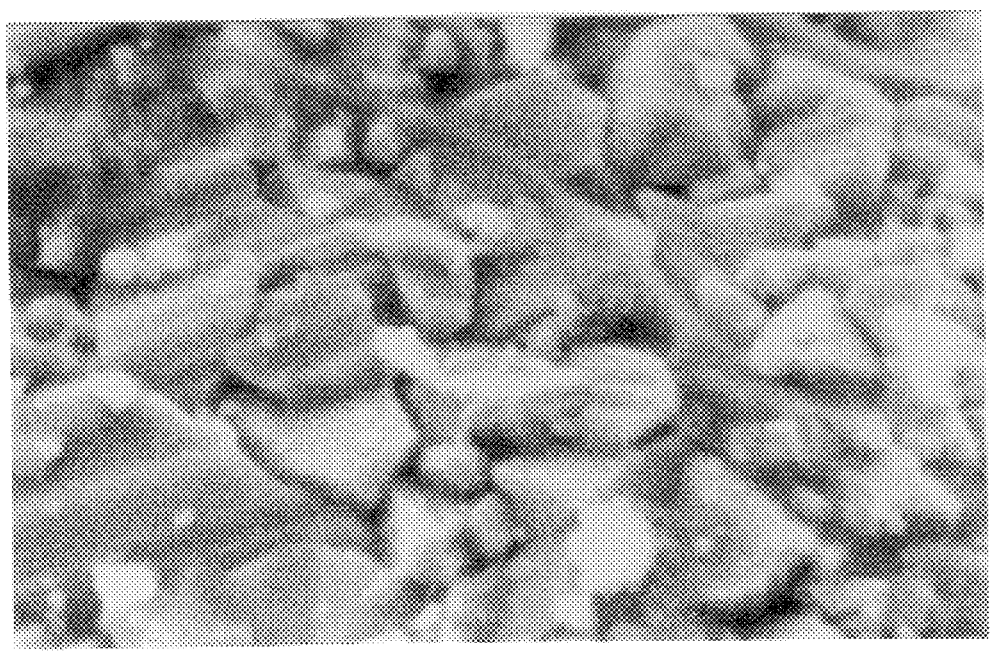
Figure 3A:
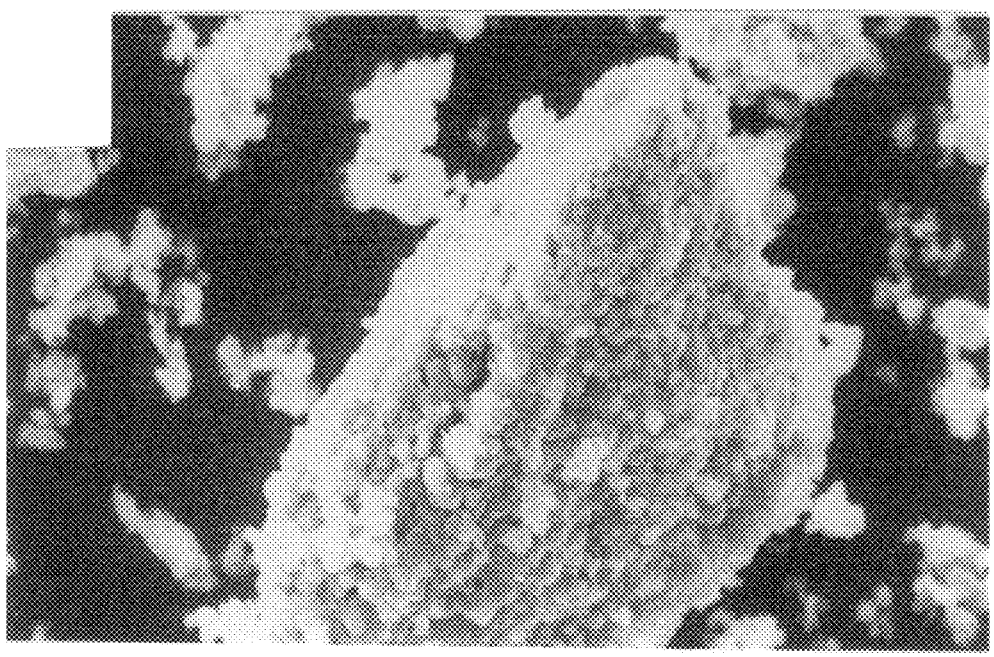
FIGS. 3a and 3b are SEM photographs illustrating a positive active material heat-treated at low and high temperatures according to Example 1 of the present invention.
Figure 3B:
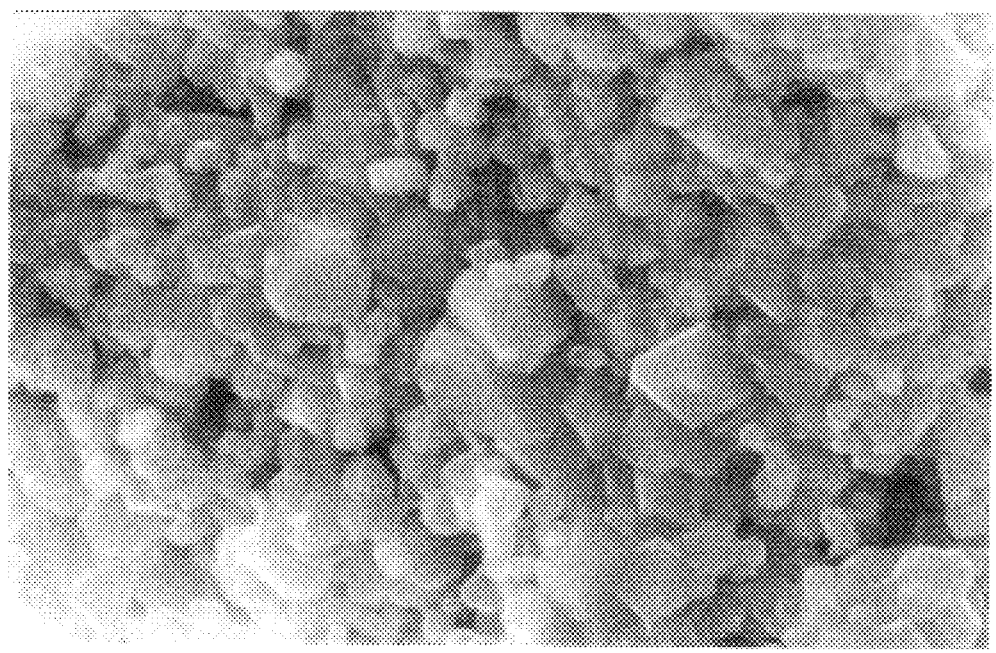
Figure 4A:
FIGS. 4a and 4b are SEM photographs illustrating a positive active material according to Comparative example 1.
Figure 4B:
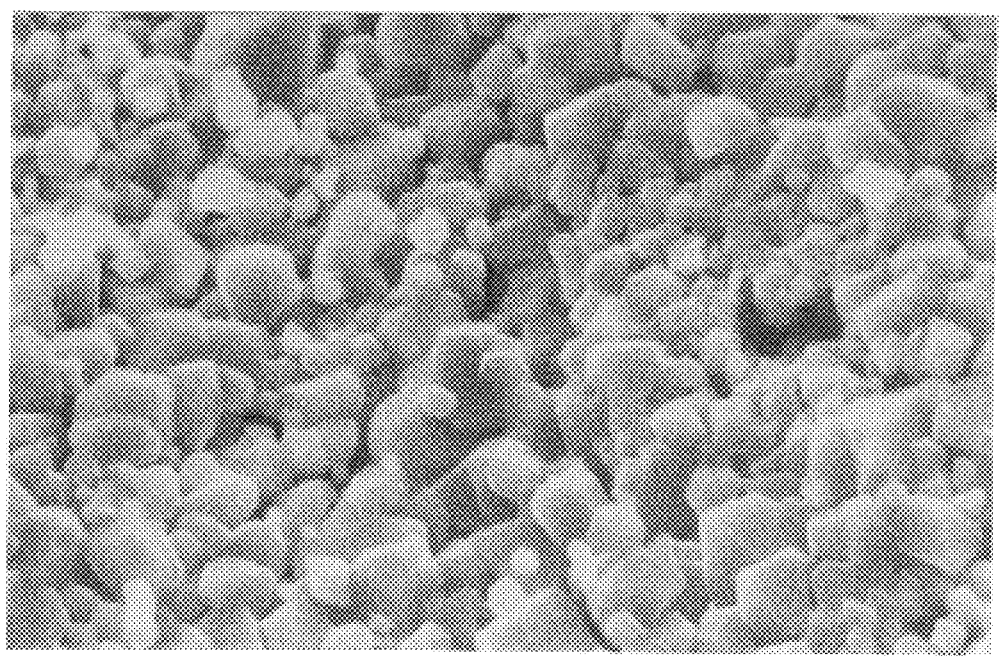

SEM photographs of the pre-heat-treated material and the heat-treated active material according to Example 1 are presented in FIGS. 2a and b, and FIGS. 3a and b respectively. FIGS. 4a and b show the SEM photographs of the active material according to Comparative Example 1. FIGS. 2b, 3b and 4b are the SEM photographs of FIGS. 2a, 3a, and 4a, respectively, enlarged 10 times. The surface of the material heat-treated at 150° C. (FIGS. 2a and b) is different from that of $LiMn_2O_4$ (FIGS. 4a and b). Whereas, the surface of the positive active material which was again heat-treated at 800° C. is similar to that of $LiMn_2O_4$. That is, the material heat-treated at the low temperature has the $LiCoO_2$ coating layer such that it has a smooth surface, which is different from that of $LiMn_2O_4$, but the material heat-treated again has no $LiCoO_2$ coating layer or octahedral type spinel, similar to $LiMn_2O_4$. The results show that $LiCoO_2$ reacts with $LiMn_2O_4$ at high temperatures to generate $Li_{1+x}Mn_{2-y}Co_yO_4$. In fact, elemental analysis results show that the powder heat-treated at 800° C. was $Li_{1.03}Mn_{1.97}Co_{0.03}O_4$.

Figure 5A:
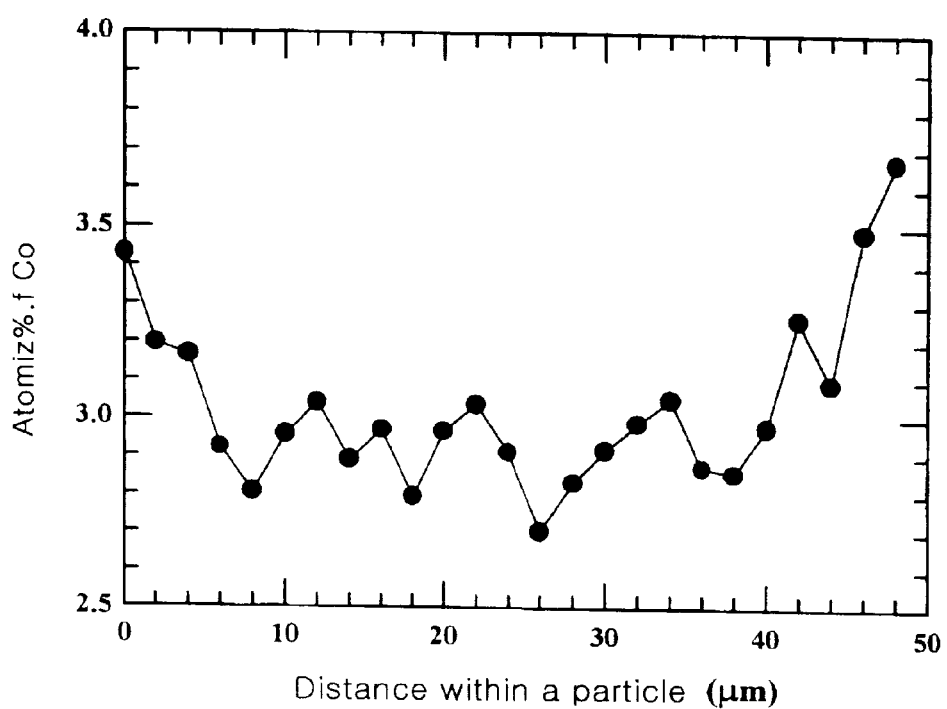
FIG. 5a is a graph illustrating an electron probe microanalysis (EPMA) result of a positive active material according to Example 1 of the present invention.
Figure 5B:
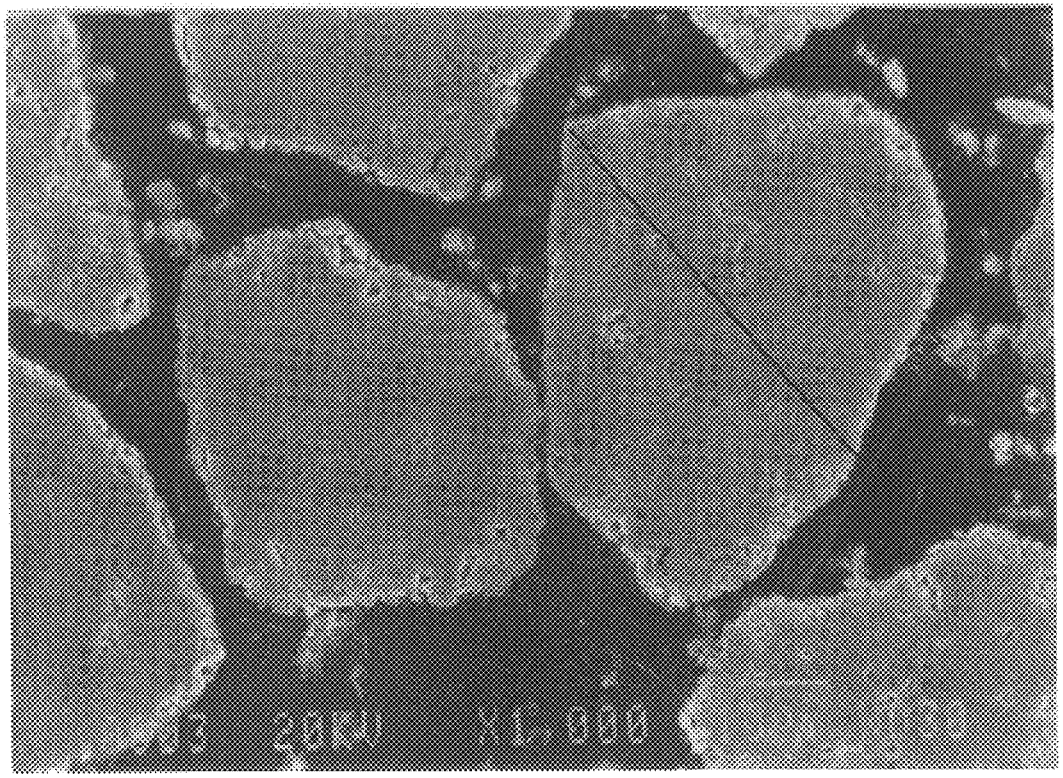
FIG. 5b is a SEM photograph of the positive active material sample used in the EPMA.

The reaction occurred more actively at the surface such that the concentration of Co in the surface portion is higher than that in the central portion. For determining the concentration of Co in the surface portion in comparison to that in the central portion, electron probe microanalysis (EPMA) of the active material according to Example 1 was performed. The results are presented in FIG. 5a. In FIG. 5a, the x axis (distance within a particle) indicates the line shown as the particle diameter in FIG. 5b. FIG. 5b shows a SEM photograph of the positive active material sample used in the EPMA. As shown in FIG. 5a, the Co content in the active material according to Example 1 is highest at the outermost surface portion and is higher than the central portion from the outermost surface to a depth of 10 microns.

Figure 6:
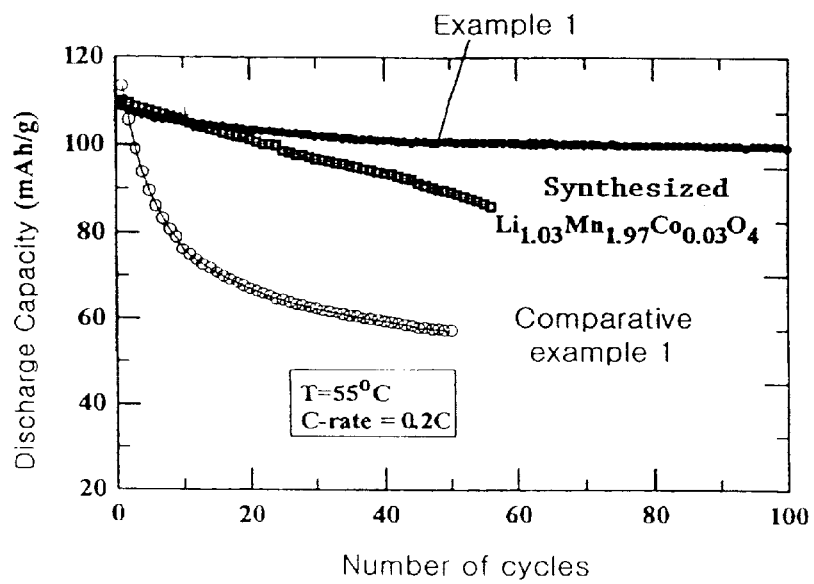
FIG. 6 is a graph illustrating high-temperature characteristics of the positive active material according to Example 1 of the present invention, Comparative Examples 1 and Comparative Example 2 ($Li_{1.03}Mn_{1.97}Co_{0.03}O_4$)

It is believed that the high concentration of Co in the surface portion prevents the elution of Mn and stabilizes the structure of the active material. This belief is supported by the high-temperature (55° C.) cycle life characteristics results shown in FIG. 6. FIG. 6 shows the high-temperature (55° C.) cycle life characteristics of the half-cell using the positive active material according to Example 1, Comparative Example 1 and Comparative Example 2 (Synthesized $Li_{1.03}Mn_{1.97}Co_{0.03}O_4$). In the half-cell, metallic lithium was used as the reference electrode, and polyvinylidene fluoride was used as the binder. Carbon black was used as the conductive agent, and N-methyl pyrrolidone was used as the solvent. The separator was obtained from Celgard Co., and the electrolyte used was $LiPF_6$ in ethylene carbonate and dimethyl carbonate. As shown in FIG. 6, the active material according to Example 1 exhibited excellent high-temperature cycle life characteristics.

Figure 7:
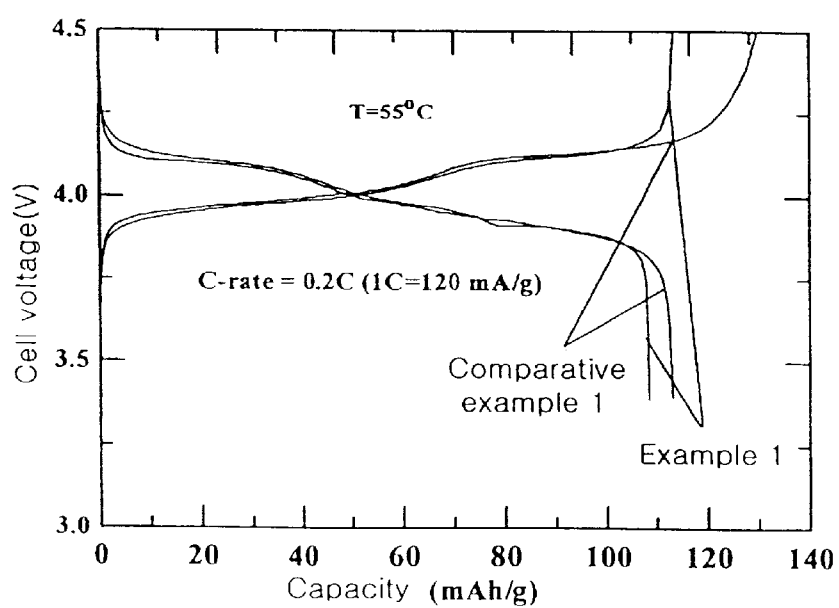
FIG. 7 is a graph illustrating initial charge and discharge characteristics of the positive active materials according to Example 1 and Comparative Example 1.

FIG. 7 shows the initial charge and discharge capacity of the half-cells. The cell according to Example 1 exhibited a smaller irreversible capacity than that of Comparative Example 1.

As described above, the positive active material of the present invention has a surface coated with $LiCoO_2$, which stops the elution of Mn, so the positive active material has cycle life characteristics that are improved by at least 20%, compared with $LiMn_2O_4$.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a rechargeable lithium battery represented by the formula $Li_{1+x}Mn_{2-y}Co_yO_4$, wherein $-0.1 \leq x \leq 0.1$ and $0<y<0.1$, having a concentration of Co in a surface portion higher than that in a central portion, with the surface portion being a region from an outermost surface of the positive active material to a depth of 10 microns, wherein the ratio of the concentration of Co in the central portion to that in the surface portion ranges from 1:1.05 to 1:1.30.

2. A method of preparing a positive active material for a rechargeable lithium battery comprising the steps of:

obtaining a sol or gel-cobalt material by mixing lithium salts, cobalt salts, an alcohol and chelating agents and heating the mixture;

mixing the sol or gel-cobalt material with $LiMn_2O_4$; and heat-treating the mixture, wherein the positive active material is $Li_{1+x}Mn_{2-y}Co_yO_4$ where $-0.1 \leq x \leq 0.1$ and $0<y<0.1$ and has a concentration of Co in a surface portion higher than that in a central portion, the surface portion being a region from an outermost surface of the positive active material to a depth of 10 microns.

3. The method of claim 2 wherein the ratio of the cobalt material to $LiMn_2O_4$ ranges from 1:99 to 5:95 (1 to 5:99 to 95) wt %.

4. The method of claim 2 wherein the mixture is heat-treated at a temperature ranging from 550 to 850° C.

5. The method of claim 2 wherein the cobalt material is $LiCoO_2$.

6. The method of claim 2 wherein the cobalt salt is selected from the group consisting of cobalt hydroxide, cobalt nitrate and cobalt carbonate.

7. The method of claim 2 wherein the lithium salt is selected from the group consisting of lithium carbonate, lithium nitrate and lithium hydroxide.

8. The method of claim 2 wherein the chelating agent is selected from the group consisting of oxalic acid, citric acid and glycine.

9. The method of claim 2 wherein the alcohol is selected from the group consisting of ethanol and methanol.

10. The method of claim 2 wherein the $LiMn_2O_4$ has a spinal phase.

11. The method of claim 2 wherein the mixture of the sol or gel cobalt material and $LiMn_2O_4$ is heat treated at a temperature ranging from 550 to 850° C.

12. The method of claim 11 wherein the mixture of the sol or gel cobalt material and $LiMn_2O_4$ is heat treated at a temperature ranging from 700 to 850° C.

13. The method of claim 2 further comprising a pre-heat-treatment step.

14. The method of claim 13, wherein the pre-heat-treatment step is performed at a temperature ranging from 100 to 300° C.

* * * * *

UNITED STATES PATENT AND TRADEMARK OFFICE
CERTIFICATE OF CORRECTION

PATENT NO. : 6,274,273 B1
DATED : August 14, 2001
INVENTOR(S) : Jae-Phil Cho, Geun-Bae Kim and Yong-Chul Park It is certified that error appears in the above-identified patent and that said Letters Patent is hereby corrected as shown below:

<u>Title page,</u>
Item [57], ABSTRACT
Lines 5-6, replace "is represented $Li_{1+x}Mn_{2-y}Co_yO_4$ wherein -0.1<x<0.1 and 0<y<0.1."
with -- is represented by the formula $Li_{1+x}Mn_{2-y}Co_yO_4$ wherein $-0.1 \leq x \leq 0.1$ and 0<y>0.1.--

<u>Column 2,</u>
Lines 61-62, replace "the present invention is $Li_{1+x}Mn_{2-y}Co_yO_4$–01.1<x<01 and 0<y>0.1"
with -- the present invention is represented by the formula $Li_{1+x}Mn_{2-y}Co_yO_4$ wherein $-0.1 \leq x \leq 0.1$ and 0<y>0.1 --.

Signed and Sealed this

Twenty-fifth Day of February, 2003

JAMES E. ROGAN
*Director of the United States Patent and Trademark Office*